United States Patent [19]

Asars et al.

[11] 4,112,333
[45] Sep. 5, 1978

[54] DISPLAY PANEL WITH INTEGRAL MEMORY CAPABILITY FOR EACH DISPLAY ELEMENT AND ADDRESSING SYSTEM

[75] Inventors: Juris A. Asars; Karl K. Yu, both of Murrysville Borough, Pa.

[73] Assignee: Westinghouse Electric Corp., Pittsburgh, Pa.

[21] Appl. No.: 780,624

[22] Filed: Mar. 23, 1977

[51] Int. Cl.² ............ H05B 37/00; H05B 39/00; H05B 41/00
[52] U.S. Cl. ............ 315/169 TV; 340/324 M; 340/166 EL; 315/169 R
[58] Field of Search ............ 313/500, 505, 494; 315/153, 169 TV, 51, 169 R; 350/160 LC; 307/298, 246, 251; 340/324 M, 166 EL

[56] References Cited

U.S. PATENT DOCUMENTS

| | | | |
|---|---|---|---|
| 3,840,695 | 10/1974 | Fischer | 358/61 |
| 3,885,196 | 5/1975 | Fischer | 315/169 TV |
| 4,041,481 | 8/1977 | Sato | 340/324 M |
| 4,042,854 | 8/1977 | Luo et al. | 315/169 TV |

OTHER PUBLICATIONS

"Human Performance Evaluation of Matrix Displays . . .", Report No. Ad/A-029932, pp. 124-130.
"Experimental Realization of Floating-Gate-Memory Thin-Film Transistor", Yu, Brody, & Chen, Proceedings of the IEEE, May 1975, pp. 826, 827.

Primary Examiner—Alfred E. Smith
Assistant Examiner—Robert E. Wise
Attorney, Agent, or Firm—W. G. Sutcliff

[57] ABSTRACT

A planar display panel is described having an X-Y array of individually controllable display elements. A thin film floating gate transistor with memory capability is disposed integral with each display element. A storable information potential is applied to the transistor gate to induce a potential on the floating gate which determines high and low conductance states for the transistor. Preferred operating modes are set forth. A preferred physical layout for the display elements is provided in which the memory transistor is optimally located to provide the maximum display area.

7 Claims, 5 Drawing Figures

DISPLAY PANEL WITH INTEGRAL MEMORY CAPABILITY FOR EACH DISPLAY ELEMENT AND ADDRESSING SYSTEM

BACKGROUND OF THE INVENTION

The present invention relates to the field of planar or flat panel displays. A variety of technologies have been proposed for such flat panel light emitting diode arrays, electroluminescent arrays, and liquid crystal arrays. The addressing systems have included coincidence X-Y addressing, and more recently the use of thin film transistor control circuitry integral on the panel with individual display elements as seen in U.S. Pat. Nos. 3,840,695 and 4,006,383.

The thin film transistor provides an electrical device uniquely suitable for use in flat panel display devices. It is known that a thin film transistor can be fabricated with an insulated floating gate to provide a device with controllable variable conductance properties, which can be termed a memory transistor. Such devices and fabrication techniques are set forth in "Experimental Realization of Floating-Gate-Memory Thin-Film Transistor", Proceedings of the IEEE, Vol. 63, pp. 826–827, May 1975.

The liquid crystal display medium is a passive rather than active medium and for this reason offers several important functional advantages. These include the ability to utilize ambient light and to be readable in high external light level conditions. The medium can be driven by low DC voltage and are low power consumption devices. A liquid crystal display can be based on controlled light transmissivity or reflectivity.

The thin film memory transistor integrally combined with the liquid crystal display medium eliminates the need for large area signal storage capacitors as part of the display element, thus optimizing the liquid crystal medium area. The transistor provides the necessary threshold and elemental storage needed for refresh multiplexing applications. The liquid crystal medium can be of the twisted nematic or dynamic scattering operating mode.

The electro-optic display system of the present invention can be used to display alpha-numeric information as well as to provide a general pictoral display.

SUMMARY OF THE INVENTION

A flat display panel comprised of an X-Y array of display elements, with integral thin film memory transistor means disposed as a part of each display element. The drive system includes means for storing a high or low transistor conductance information signal on the memory transistor. This stored transistor conductance controlling information signal then controls the amplitude and duty cycle of a periodic potential applied across the electrodes of the liquid crystal element to which the transistor is connected. The display elements preferably utilize a liquid crystal display medium, but the present system is usable with electroluminescent display medium as well.

DESCRIPTION OF THE PREFERRED EMBODIMENT

Figure 1:
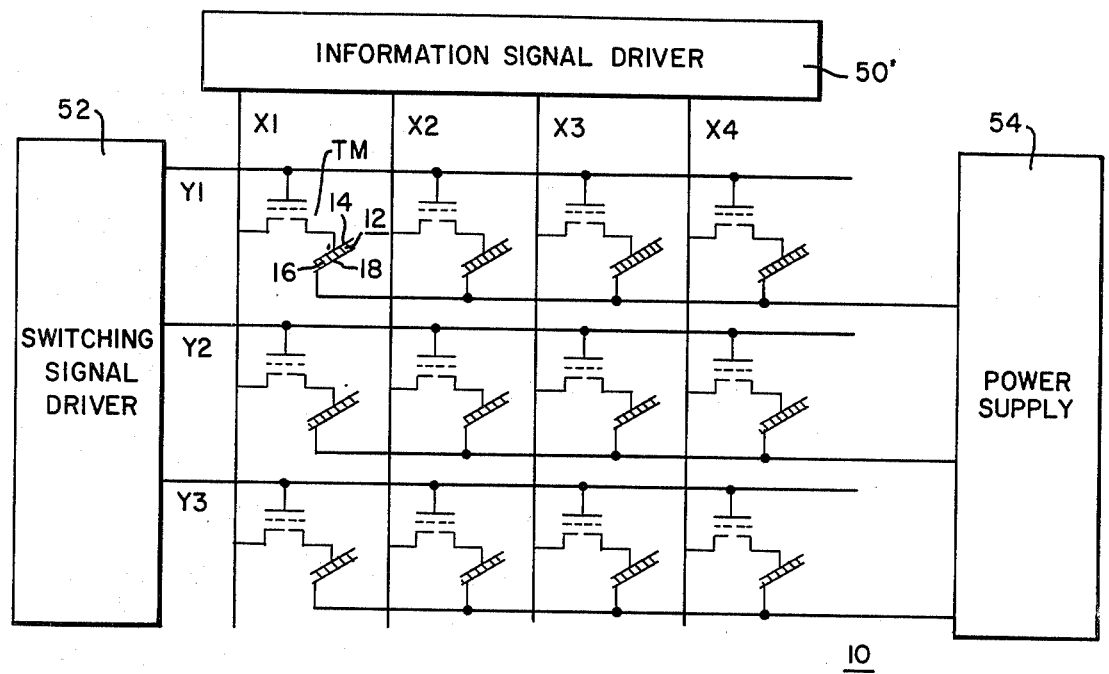
FIG. 1 is a schematic illustration of a portion of the display panel of the present invention.

The present invention can be best understood by reference to the drawings which illustrate the liquid crystal display medium embodiment. The display panel 10 is shown schematically in FIG. 1 comprised of an X-Y array of identical liquid crystal display elements 12 defined between vertical information buses X1, X2, X3, X4, and horizontal switching buses Y1, Y2, Y3. The number of rows and columns can be widely varied as well as the dimensions of the display elements to produce the desired lines per inch of display elements which determines the resolution of the resultant display.

The information $Xi$ buses are connected at the periphery of the display panel to information signal driver means 50, which provides the information signal for a particular display element of the array panel. The information potential determines whether the liquid display element is partly on, fully on, or off. The switching signal $Yj$ buses are connected at the periphery of the display panel to a switching signal driver means 52, which synchronizes the addressing of the information signal on the $Xi$ bus to determine that the proper display element of the array is addressed with the proper information signal.

Associated with each display element 12 is a memory thin film transistor TM. The gate of transistor TM is connected to the appropriate row bus $Yi$ which defines the display element row. The source of TM is connected to the column bus $Xi$ which defines the display element column. The drain of transistor TM is connected to one electrode 14 for the liquid crystal display medium 16. A unitary, light transmissive front electrode 18 covers the entire display array. The transistor TM includes a floating gate which provides the memory capability for the transistor.

The front electrode 18 is connected at the panel periphery to the power supply 54 for the liquid crystal transmission state drive potential to determine the opacity of the liquid crystal medium at an individual display element. For a controlled light transmission mode panel, the individual electrodes 14 are light transmissive and light is directed through the substrate back side of the panel to create the display image. For a reflection mode panel, the electrode 14 are reflective and act as mirrors to the light directed through the front of the panel.

Figure 2:
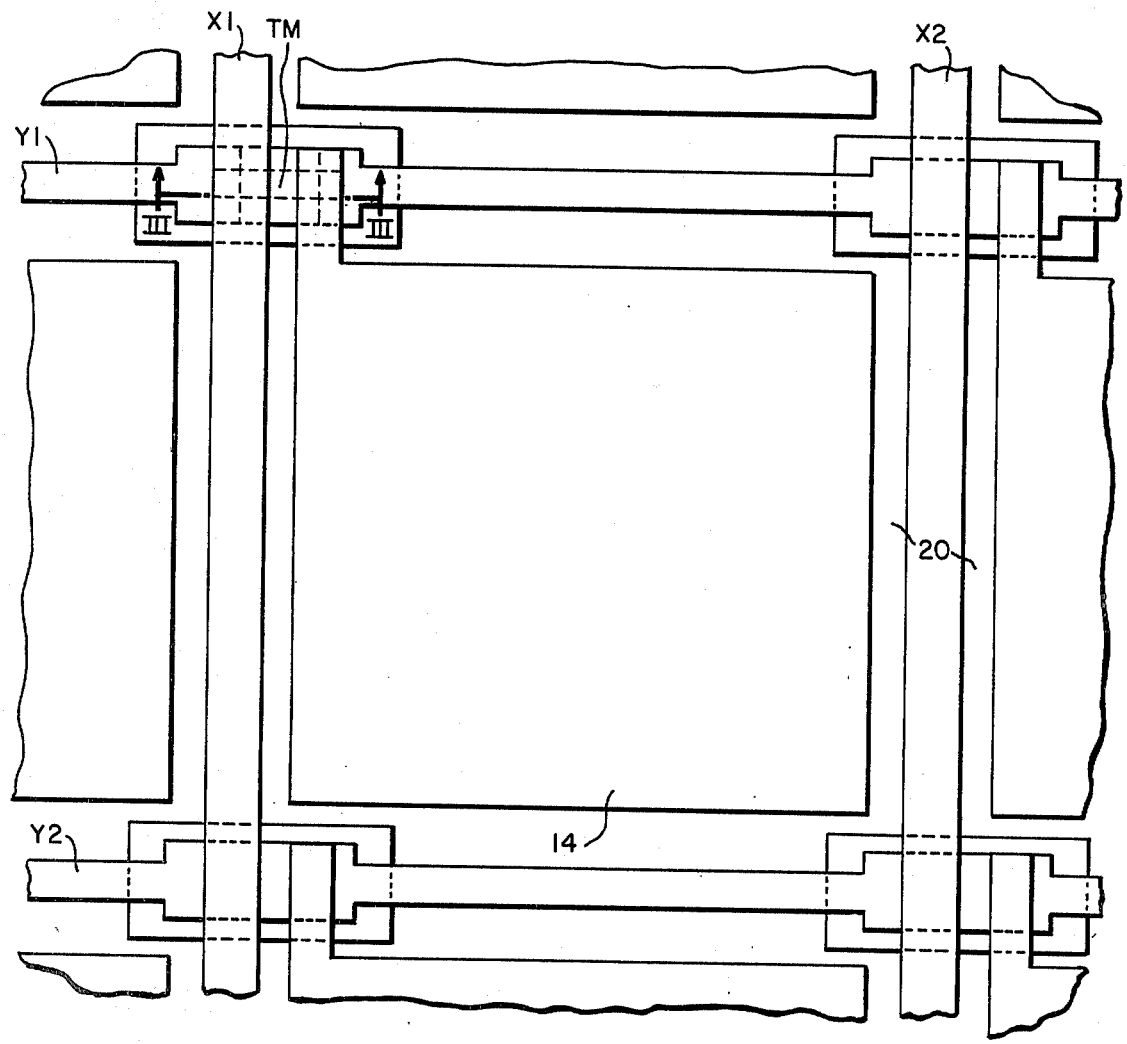
FIG. 2 is a plan view of the layout of a single liquid crystal display element portion of the display panel.
Figure 3:
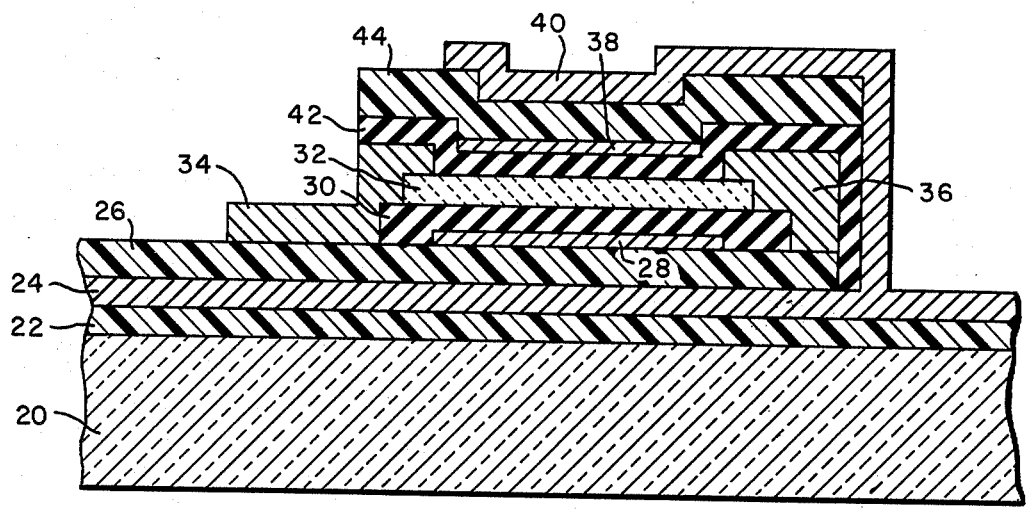
FIG. 3 is a cross section view taken through the portion of FIG. 2 along lines 3—3 to show the memory transistor structure.

The structure of the display element and the transistor are seen in greater detail in FIGS. 2 and 3. The transistor TM is disposed at the upper left corner of display element 12 proximate the intersection of buses $Xl$ and $Yl$. The drain of TM is continued into the electrode 14 which covers most of the area between the spaced-apart row and column buses which define display element 12. The liquid crystal display medium is disposed over the entire area of the display panel with insulating layers provided over exposed conductors except over electrode 14, which is uncovered and in direct contact with the display medium. The light transmissive, common conductive electrode 18 covers the display panel over the display medium.

The thin film memory transistor TM is seen in greater detail in FIG. 3. The display panel comprises the supporting insulating substrate 20 upon which the conductive buses and display elements are disposed. The supporting insulating substrate 20 is typically quartz or high temperature glass which is typically coated with a thin layer 22 of aluminum oxide. The plurality of horizontally extending Y switching buses are deposited as thin film strips of aluminum or other such conductive metal, which are spaced apart by the desired display element dimension. The display medium electrode 14 can likewise be deposited directly on the substrate as an aluminum film pad which is approximately square in the embodiment shown and is interrconnected with the drain contact 36 of the transistor TM.

The floating gate thin film transistor TM is then constructed proximate each layout intersection of the X and Y buses. The Y bus already deposited serves as a gate connection for the transistor TM. The Y bus portion which is to serve as the gate 24 of transistor TM is insulated by a deposited layer of aluminum oxide 26. A floating gate 28 of aluminum is deposited just to the right of the layout point for X-Y bus intersection. An additional relatively thin layer of silicon oxide 30 is deposited over floating gate 28. The semiconductive channel 32 of cadmium selenide is deposited aligned over the gates 24 and 28. Source and drain contacts 34 and 36, respectively, are deposited in overlapping contact with opposed ends of the semiconductive channel 32. This would comprise an operative memory transistor, but it has been found advantageous to construct the device with a top floating gate 38 and top gate 40 aligned over the semiconductive channel 32 with interposed insulating layers 42 and 44. The top gate 40 is electrically connected to the bus which serves as lower gate 24. The semiconductive channel 32 can thus be controlled from both above and below the channel.

The plurality of vertically extending X information signal buses are deposited at a level such as to be interconnected with the source contact 34 of the transistor TM.

The insulator layer 42 is also a relatively thin layer of silicon oxide, and insulator layer 44 is a relatively thicker layer of aluminum oxide. The floating gates 28 and 38 are shown as continuously metal layers, but are very thin deposits typically only about 5 to 30 Angstroms thick of aluminum or gold, and may be thought of as an interfacial dopant layer between the silicon oxide and aluminum oxide layers between which they are respectively deposited.

The X and Y buses extend to the periphery of the display panel where they are connectable to drive and switching signal means for operating the panel as will now be described.

STEADY STATE OPERATION

Figure 4:
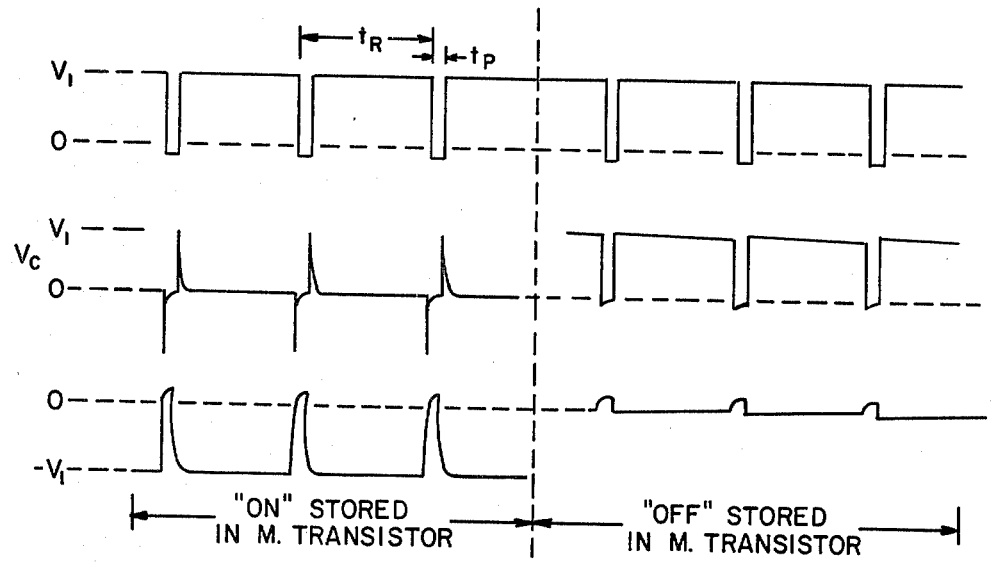
FIG. 4 illustrates three waveforms which illustrate the operating potentials when information is displayed but not erased or written.

A schematic portion of the proposed Thin Film Memory Transistor-Liquid Crystal Display matrix is illustrated in FIG. 1. FIG. 4 illustrates one of the steady state operating modes of this matrix. During steady state opeation, when information is displayed but not erased or written, both X$i$ and Y$j$ bus bars are held at common or zero potential. Low duty cycle negative pulses with a positive bias are applied to the front electrode, common for all the liquid crystal cells in the matrix, as illustrated in the top waveform of FIG. 4. The positive bias of this waveform is determined by the maximum signal required for the particular liquid crystal layer. The pulse amplitude is somewhat larger than the bias to compensate for capacitive potential division between the liquid crystal element capacitance and the drain to gate capacitance in the thin film transistor. In this operating mode, if a high conductance state has been stored in the thin film memory transistor, the liquid crystal element or capacitor is discharged and charged following every leading and trailing edge of the front electrode pulses respectively. As indicated in the illustration, this results in a very high duty cycle potential bias across the liquid crystal element. If a low conductance state has been stored in the thin film memory transistor, the liquid crystal capacitor is periodically discharged by every pulse to remove charge accumulated from leakage currents during the period between the pulses. In this state the field across the liquid crystal element is almost zero.

A second operating mode for the same matrix is obtained if the positive bias on the common front electrode is reduced to zero. In this mode a high conductance state stored in the memory transistor corresponds to zero bias potential with short, very low duty cycle pulses across the liquid crystal cell. A low conductance state stored in the memory transistor corresponds to a steady state bias, somewhat smaller than the pulse amplitude, across the liquid crystal cell. By introducing or eliminating a single bias, and thereby changing between the two operating modes, the information displayed on the matrix can be negated during normal operation.

Choice of the operating mode for a particular display depends on many factors. The following differences between the two modes are among the factors to be considered:

1. The first operating mode results in a bias potential between the matrix bus bars and the common electrode for the liquid crystal layer. In the second mode only the short pulses are impressed across the liquid crystal covering the X$i$ and Y$j$ buses. A thick insulating layer could be required to reduce the bias potential gradient for the first operating mode below the liquid crystal threshold.

2. While in the low field state for the second operating mode the bias potential across the liquid crystal layer is equal to zero; short, low duty cycle pulses with full amplitude are superimposed on it. Liquid crystal materials with very fast response might not be compatible with this operating mode.

3. In either operating mode steady state power dissipation is higher in elements with high conductance state stored in the corresponding memory transistors than in the ones with low conductance state. If the expected ratio between the optically "ON" and "OFF" elements is different from one, power requirements can be minimized by the operating mode choice.

4. In either operating mode the time required to store a high conductance state in the thin film memory transistor is longer than to store a low conductance state. Signal distribution requirements in the time domain will be influenced strongly by the choice of the operating mode.

5. If the liquid crystal material exhibits a threshold, a bias can be introduced on the common front electrode thereby reducing the pulse amplitudes, power dissipation and signal distribution levels.

By way of example, typical operating parameters for the steady state operating mode illustrated in FIG. 4 are that the positive bias V1 is 80 volts, the time between pulses $t_r$ is 1 millisecond, and the negative pulse width $t_p$ is 100 microseconds. The capacitance of the liquid crystal element across the electrodes is 0.14 picofarads. For the transistor TM, with a high conductance state stored on the transistor floating gate and zero gate-source potential, the drain current $I_{DS}$ is equal to or greater than 200 nanoamps and the drain-source voltage is 10 volts. When a low conductance state is stored on the transistor floating gate, the drain current $I_{DS}$ is equal to or less than 1 nanoamp and the drain-source voltage is 80 volts. The leakage resistance of the liquid crystal cell is equal to or greater than $10^{10}$ ohms. The negative pulse amplitude on the common front electrode of the liquid crystal element is 90 volts.

INFORMATION STORAGE

Figure 5:
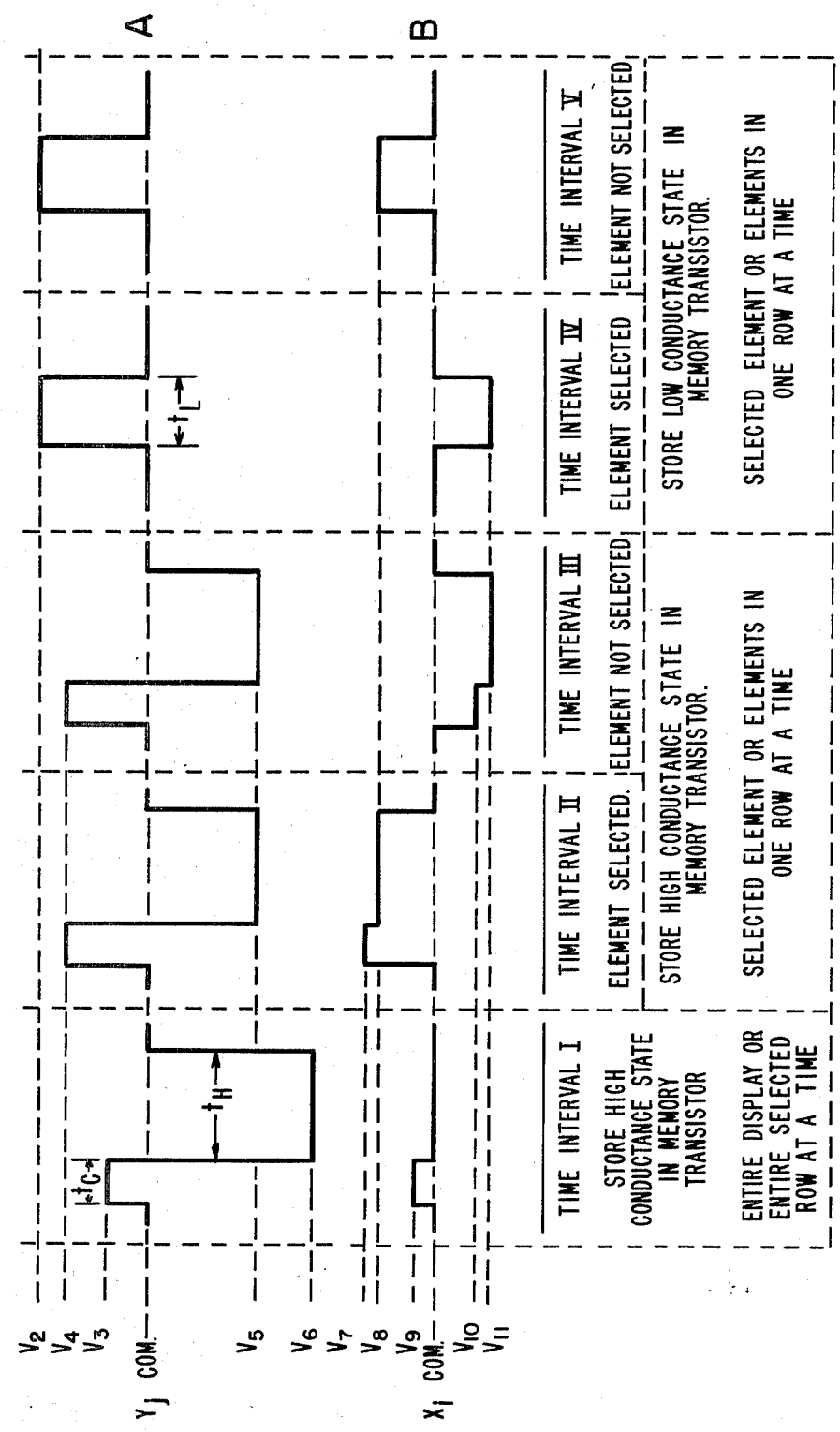
FIG. 5 illustrates exemplary waveforms applied to the buses $Xi$ and $Yj$ when the information signal is to be applied to a given display element.

Information to be displayed is stored in the thin film memory transistor matrix as high and low conductance transistor states by a combination of positive and negative potential pulses on the Xi and Yj bus bars. A large number of signal or information distribution methods can be used with matrix such as: store high conductance state in the entire matrix at one time and then store low conductance states at selected matrix points one element at a time. FIG. 5 illustrates representative basic operations with respective Xi and Yj bus bar waveforms that could be used for these basic operations. While it is not necessary, these waveforms are based on the simplifying assumption that the common front electrode pulses are absent during information storage. The first three time intervals in FIG. 5 illustrate storage of a high conductance state in the selected thin film transistor or transistors. Since the thin film memory transistors are biased "OFF" during a high conductance storage pulse, these pulses are preceded by charge equalization pulses V3 that turn the transistors "ON" and charge the liquid crystal capacitors to required potentials. Pulses V9 on the Xi bus bars during the equalization period compensate for capacitive potential division and insure that during the storage period the potential difference between the source and drain of any transistor is zero. As indicated in time interval I of FIG. 5, a high conductance state can be stored in the thin film memory transistors on an entire line of the display matrix at one time by a single negative, full amplitude pulse V6 on the corresponding Yj bus bar. More than one line can be selected at any one time. The second and third time intervals of FIG. 5 illustrate coincidence high conductance state storage. A ⅔ amplitude, negative pulse V5 on the Yj bus bar of the selected row and a ⅓ amplitude, positive pulse V8 on one or more Xi bus bars corresponding to selected elements in that row results in a full amplitude storage pulse at the selected matrix point or points. A ⅓ amplitude, negative pulse V11 on all other Xi bus bars reduces the storage pulse amplitude to ⅔ of full at all the remaining elements of the selected row. The information stored at these elements, as well as at all elements in other rows of the matrix, remains unchanged. High conductance states can also be stored at selected points in a column at one time by similar waveforms.

The fourth and fifth time interval of FIG. 5 illustrate coincidence storage of low conductance state at one or more elements in a selected row. This operation does not need an equalization period because the thin film transistors are biased "ON" during a low conductance storage pulse. A ⅔ amplitude, positive pulse V2 on the Yj bus bar of the selected row and a ⅓ amplitude, negative pulse V11 on one or more Xi bus bars corresponding to selected matrix point or points results in a full amplitude storage pulse at the selected matrix point or points. A ⅓ amplitude, positive pulse on V8 all other Xi bus bars reduces the storage pulse amplitude at remaining elements in that row and they retain previously stored information. Low conductance states can also be stored on row-at-a-time, column-at-a-time, entire display-at-a-time, and selected elements in a column-at-a-time basis with similar waveforms. These basic operations can be combined into a multitude of single mode or multimode information distribution methods.

For the basic operations set forth in FIG. 5 for information addressing and in the absence of pulses on the common front electrode, the following are exemplary requirements. The positive transistor turn on pulse V3 is 35 volts with a pulse duration $t_c$ of 100 microseconds. The high conductance information signal pulse V6 has a potential of −150 volts and has a pulse width $t_h$ of 3 milliseconds. The low conductance information signal pulse V2 has a potential of 100 volts with a 3 microsecond pulse width $t_L$. The other driving waveform potentials are V4 of 85 volts, V5 of −100 volts, V7 or 70 volts, V8 of 50 volts, V9 of 20 volts, V10 of −30 volts, and V11 of −50 volts.

The display system invention has been explained with reference to a liquid crystal display medium, but an electroluminescent medium can be readily used in this system with some adjustment of the respective operating potentials.

We claim:
1. A display system comprising:
   (a) an X–Y display element array panel, in which X–Y row and column buses are disposed on a substrate insulated from each other for peripheral connection to drive signal means, and for interconnection of the display elements,
   (b) display elements defined between the X–Y row and column intersections with a display medium disposed between spaced-apart electrodes, with an integral thin film memory transistor connected at each display element to the row and column buses and to one display element electrode,
   (c) means for addressing an information potential to each floating gate of the memory transistor associated with each display element which information potential determines the conductance state for the memory transistor, which means provides a transistor turn on pulse signal applied via the selected Y bus to turn on the selected transistor if the selected transistor is not already biased on, and provides a simultaneous charge equalizing pulse signal applied via the X bus if the selected transistor is not already biased on, and wherein the information potential is thereafter applied as the sum of pulse signals applied on the selected X and Y bus for the selected display element to induce a corresponding information potential on the selected floating gate,
   (d) means for applying a selected periodic display drive potential to a common display element electrode, with the display medium disposed between the common display element electrode and the spaced apart individual display element electrodes which are connected to a contact of the respective memory transistor associated with the display element, and including means for connecting the selected X and Y buses at a selected display element to a common reference potential relative to the periodic display drive potential to permit actuation of the display medium when the stored information potential on the floating gate of the memory transistor biases the transistor on to control the amplitude and duty cycle of signal across the display element electrodes for actuating the display element.

2. The display system set forth in claim 1, wherein the display medium is a liquid crystal material.

3. The display system set forth in claim 1, wherein the memory transistor has an address gate connected to one of the X or Y row or column buses, and a floating gate to give the transistor memory capability.

4. The display system set forth in claim 3, wherein the source of the transistor is connected to the other one of the X or Y buses.

5. The display system set forth in claim 4, wherein a floating gate is insulated and spaced from each side of the semiconductive layer of the transistor, and an address gate is disposed insulated and spaced from each floating gate, which address gates are interconnected.

6. The display system set forth in claim 1, wherein a positive potential pulse is applied to the Y bus to turn on the transistor, and wherein a high conductance transistor state determining information potential is then addressed to the memory transistor by a negative pulse, while a low conductance transistor state determining information potential is addressed as a positive pulse.

7. The display system set forth in claim 1, wherein the information potential is a resultant potential from coincident pulse signals applied via the Y and X buses.

* * * * *